(No Model.) 2 Sheets—Sheet 1.

T. FROGGATT.
ELECTRIC BATTERY.

No. 550,167. Patented Nov. 19, 1895.

Witnesses
H. van Dedemeel
E. K. Sturtevant

Inventor
Thomas Froggatt
by [signature]
Attorneys

ANDREW B. GRAHAM, PHOTO-LITHO, WASHINGTON, D.C.

(No Model.) 2 Sheets—Sheet 2.
T. FROGGATT.
ELECTRIC BATTERY.
No. 550,167. Patented Nov. 19, 1895.
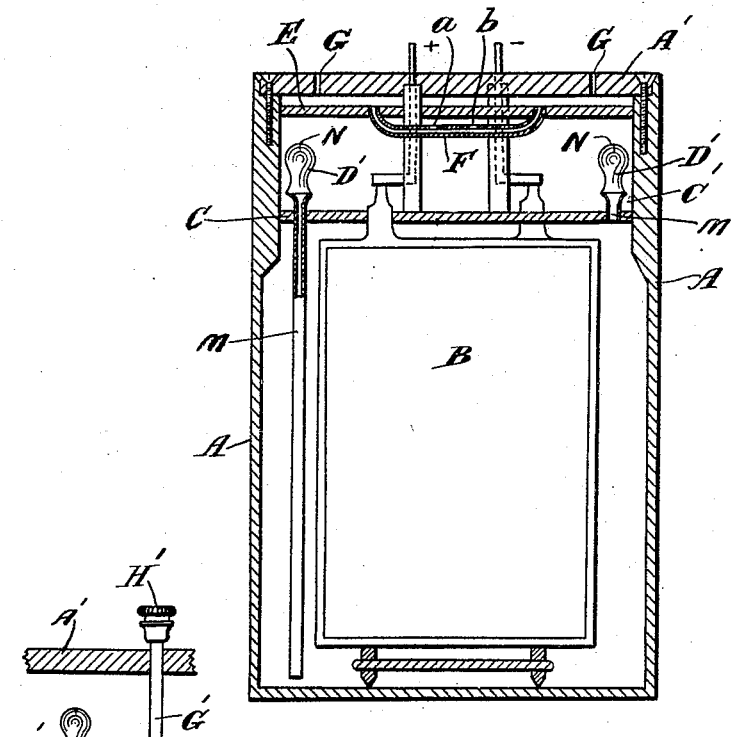
Fig. 8.
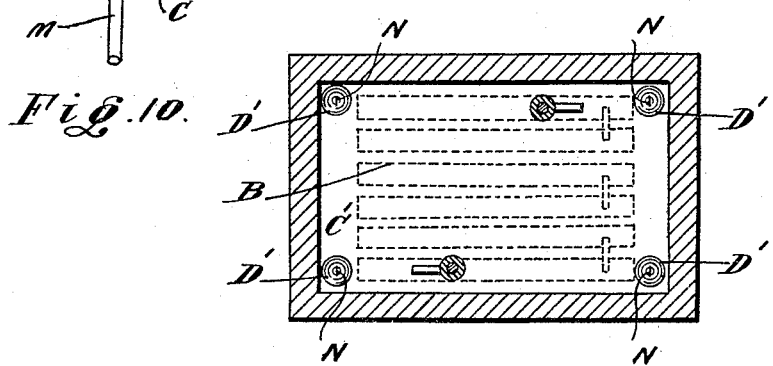
Fig. 10.
Fig. 9.
Witnesses
H. van Cleemput
E. H. Sturtevant
Inventor
Thomas Froggatt
by
Attorneys

UNITED STATES PATENT OFFICE.

THOMAS FROGGATT, OF LONDON, ENGLAND.

ELECTRIC BATTERY.

SPECIFICATION forming part of Letters Patent No. 550,167, dated November 19, 1895.

Application filed May 1, 1895. Serial No. 547,755. (No model.) Patented in England October 23, 1892, No. 19,393, and in France January 18, 1894, No. 233,667.

*To all whom it may concern:*

Be it known that I, THOMAS FROGGATT, residing at London, England, have invented Improvements in Electric Batteries, (for which I have obtained Letters Patent in France under No. 233,667, issued January 18, 1894, and in Great Britain, No. 19,393, dated October 23, 1892,) of which the following is a specification.

My invention has for its object to so construct the containing apparatus of electric batteries in which liquid is used in the cells as to prevent such liquid escaping, while at the same time permitting the gases generated to escape therefrom for the prevention of fracture of the apparatus, and thereby facilitate the construction of such batteries, so that these may be safely transported on the person, in the pocket, or otherwise, without the liquid leaking therefrom, and applies more particularly to storage or secondary batteries to be carried upon the person for supplying current to a small incandescent electric lamp, and which may be carried and used by omnibus and tramcar conductors or inspectors to enable them to examine the cash or tickets received from or handed to the passengers.

The principle of my invention may be employed in connection with any type of pocket-battery containing liquid; but in order that the manner of its operation may be clearly understood I have hereunto appended a sheet of drawings, in which I have chosen to illustrate my invention in connection with a secondary battery or accumulator.

Figure 5:
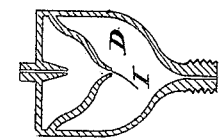
Figure 4:
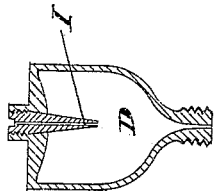
Figure 3:
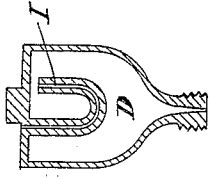
Figure 7:
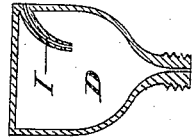
Figure 6:
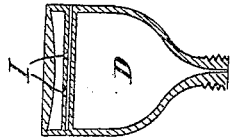
Figure 1:
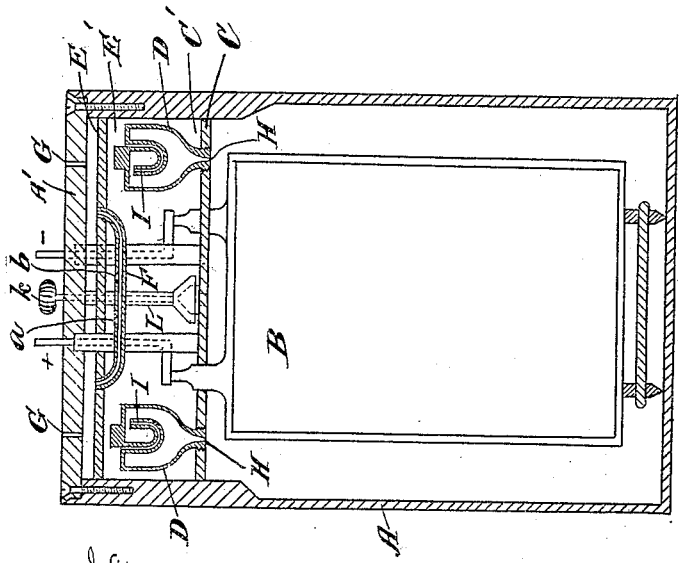
Figure 2:
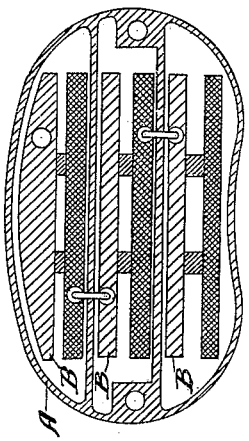

Figure 1 is a vertical section of a secondary cell constructed according to my invention. Fig. 2 is a section of the same. Figs. 3, 4, 5, 6, and 7 are enlarged sectional views of alternative methods of constructing the cup-shaped chamber of the apparatus, as hereinafter explained. Figs. 8 and 9 are views of a modified form of a battery according to my invention. Fig. 10 is a detail view of junction-pipe for filling the battery shown in Figs. 8 and 9.

In carrying my invention into effect I provide an outer case or container A of vulcanite or other non-conducting and acid-proof material, which in cross-section I prefer to be of the shape shown in Fig. 2, so as to conveniently fit the vest or other pocket, and in which are placed negative and positive plates in the usual order, and above and inclosing these and the liquid therewith I provide a horizontal diaphragm or fluid-tight partition C of the same material as A, through which the lugs of the plate B may pass and be rendered fluid-tight therewith, by which means I form a fluid-tight chamber C' above the cells, and in C, I may provide two or more tubes communicating with the cell and C', and upon the upper end of these, within C', I fix semispherical or cup-shaped chambers D, or in lieu of said tubes I may form internally-threaded holes in C and arrange the stems of the cups D to screw thereinto, as at Fig. 1.

At a suitable distance above C, I provide a second and like partition E, thus forming a second fluid-tight chamber E', and in E may be provided a tube or tubes communicating with the cover A' of the outer case A; but in lieu of this I prefer to provide a horizontal tube F below, and passing upwardly through and rendered fluid-tight, with two holes in the diaphragm E communicating with the chamber E', and in the cover A', I form two or more vent-holes G. The + and − terminals of the plates B may be led upward through the cover A', as shown.

The stem of the cups D is provided with a pinhole-aperture H, which forms a communication between the interior of the cups and the cell, these being the only apertures open through which the liquid in the cell could possibly pass if the whole apparatus were inverted.

Each of the cups D is provided internally with a crescent or other shaped pinhole-tube I, one end of which passes out through the cover of D.

The tube F is provided with two or more pinhole-apertures *a b* upon the upper surface thereof, and the action of the apparatus is as follows: The gas generated in the cell escapes through H I into the chamber C', and from this through *a b* and F into the chamber E', and from this out through the apertures G, and these same passages are the only channels through which the liquid could escape, and to prevent this these operate in the following manner: If through inadvertance the battery should get out of the perpendicular while in the pocket, some of the liquid might get through one of the apertures H into the cup D thereof; but it must rise therein sufficiently to overflow the inner end of I before it could get into the chamber C', and when in this it must rise a sufficient height to overflow the holes $a$ $b$ before it could pass out through F into the chamber E', and from here it must pass out through G before it could enter the pocket, and to prevent this I provide a valve $k$, which passes down through A' and is seated in a hole in the diaphragm C and there kept by the tension of any suitable spring, which, for preference, may be by the tension of a rubber tube L, surrounding the stem of $k$, and the wearer could, by periodically raising $k$, (when the battery is in a perpendicular position,) and thereby compressing the tube L, raise the valve from its seating in C, when any liquid that may have got into C' would pass down into the cell again, and by releasing the hold of $k$ the tension of L would place the valve in its normal position; but as only a very infinitesimal quantity of liquid would be likely to get into C', I may dispense with the valve $k$ L and the hole in C therefor and pack the cups D and the chamber C' or E', or both, with asbestos, crocidolite, or any other fibrous acid-proof material suitable for the purpose, which would absorb all the liquid that would, under any ordinary circumstances escape from the cell, and in order that such escape of liquid may not reduce the area of the active surface of the plates B, I may pack around these or the upper portion, or as much thereof as desired, with a cord or yarn made of asbestos or crocidolite, either in the manner shown by the dotted lines on B in Fig. 1 or at right angles thereto, which by capillary attraction would absorb sufficient liquid to keep the whole of the plate wet, whatever might be the level of the liquid.

In Figs. 3, 4, 5, 6, and 7 I show enlarged sectional views of modifications I may adopt in the construction of the cups D, either of which may be employed in the position shown in Figs. 1 and 2, and by the foregoing explanation of the said cups the modifications shown and the manner of their operation will be clearly understood without further description.

In Figs. 8 and 9 I show a modified construction of battery, in which the cups are substituted by flexible nipples D', each having a small slit-hole N in it, made, for example, by piercing it with a sharp-pointed instrument and not by removing any material therefrom. The nipples are preferably of the form usually employed upon feeding-bottles for children and are made of india-rubber. I may arrange four exit-pipes M, one at each corner of the battery, two of the pipes at opposite corners of the battery being led just through the cover, while the other two pipes at the remaining corners are led down to within a short distance of the bottom of the cell. By this means the battery may be tilted in any direction and always leave an escape for the gas which is not submerged by the liquid. When, now, the gaseous pressure in the cell is somewhat increased, due to the evolution of the gas from the electrolyte, such increase of pressure expands the nipple and opens the small exit orifices in the same, so that the gaseous product escapes from the cell. When the pressure has been reduced the orifice in the flexible nipple closes up of its own accord and prevents any escape of liquid, such as when the battery is tilted on one side or inverted, the pressure necessary to open the nipple orifice being more than is exerted by the head of liquid in the cell.

In Fig. 10 I show a junction-pipe G' to one of the tubes M, through which the electrolyte may be introduced. The upper part of the tube G' is closed by a detachable screw-stopper H'.

Having now particularly described the nature of my invention, what I desire to claim and to secure by Letters Patent is—

1. A pocket cell or battery comprising the case containing the positive and negative elements and exciting fluid and having a suitable cover, an inner partition having openings or passageways in each side arranged to permit the escape of the gas but to prevent the escape of the fluid, and a second partition having a centrally located exit pipe also arranged to permit the escape of the gas but not the exciting fluid, substantially as described.

2. In combination with a pocket cell or battery, an inner diaphragm having passage ways for permitting the escape of the gas, an outer diaphragm, and a U shaped tube having its ends communicating through said outer diaphragm, and its intermediate portion provided with perforations, substantially as described.

3. In combination with a pocket cell or battery, an inner diaphragm, flexible nipples D' having their interior in communication with the interior space of the cell, said nipples having enlarged bulb shaped upper ends provided with slits arranged to open sufficiently to permit the escape of the gas but preventing the escape of any of the fluid, and an outer diaphragm having a gas exit, said nipples opening into the space between the two diaphragms, substantially as described.

In testimony whereof I have signed my name to this specification in the presence of two subscribing witnesses.

THOMAS FROGGATT.

Witnesses:
  RICHARD A. HOFFMANN,
  CHARLES H. CARTER.